United States Patent
Kirchen et al.

(10) Patent No.: US 8,398,161 B2
(45) Date of Patent: Mar. 19, 2013

(54) SUNROOF HEADLINER ATTACHMENT SYSTEM

(75) Inventors: James T. Kirchen, Chippewa Falls, WI (US); David W. Edland, Chippewa Falls, WI (US); Brock T. Cooley, Bloomer, WI (US); Adam C. Peterson, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/257,297

(22) PCT Filed: Feb. 19, 2010

(86) PCT No.: PCT/US2010/024773
§ 371 (c)(1),
(2), (4) Date: Sep. 17, 2011

(87) PCT Pub. No.: WO2010/107550
PCT Pub. Date: Sep. 23, 2010

(65) Prior Publication Data
US 2012/0014766 A1    Jan. 19, 2012

Related U.S. Application Data

(60) Provisional application No. 61/161,557, filed on Mar. 19, 2009.

(51) Int. Cl.
*B60R 13/02* (2006.01)

(52) U.S. Cl. .................................. 296/214; 296/216.07

(58) Field of Classification Search .................. 296/214, 296/216.06–216.08; 24/581.11, 297; 411/508, 411/913
See application file for complete search history.

(56) References Cited

U.S. PATENT DOCUMENTS

| | | | | |
|---|---|---|---|---|
| 3,889,320 A | * | 6/1975 | Koscik | 24/297 |
| 5,876,084 A | * | 3/1999 | Smith et al. | 296/39.1 |
| 7,677,653 B2 | * | 3/2010 | Brown et al. | 296/214 |

FOREIGN PATENT DOCUMENTS

| | | |
|---|---|---|
| EP | 1947352 A1 | 7/2008 |
| JP | 04035022 U | 3/1992 |
| WO | 02/06071 A1 | 1/2002 |

OTHER PUBLICATIONS

ISR for PCT/US2010/024773 dated Aug. 10, 2010.

* cited by examiner

*Primary Examiner* — Dennis Pedder
(74) *Attorney, Agent, or Firm* — Mark W. Croll; Paul F. Donovan

(57) ABSTRACT

A vehicle headliner attachment system for displaceable attachment of a headliner to a sunroof assembly frame. The attachment system includes at least one snap-in male connector including a distal insertion head adapted to be press fit into a corresponding elongated female acceptance slot disposed at a position adjacent to the perimeter of a sunroof opening. The male connector is releasably held at a support element secured to the headliner. The support element is oriented on the headliner such that the male connector is slideable along the elongated female acceptance slot without disengaging from the support element when the headliner is moved rearward relative to the assembly frame.

20 Claims, 3 Drawing Sheets

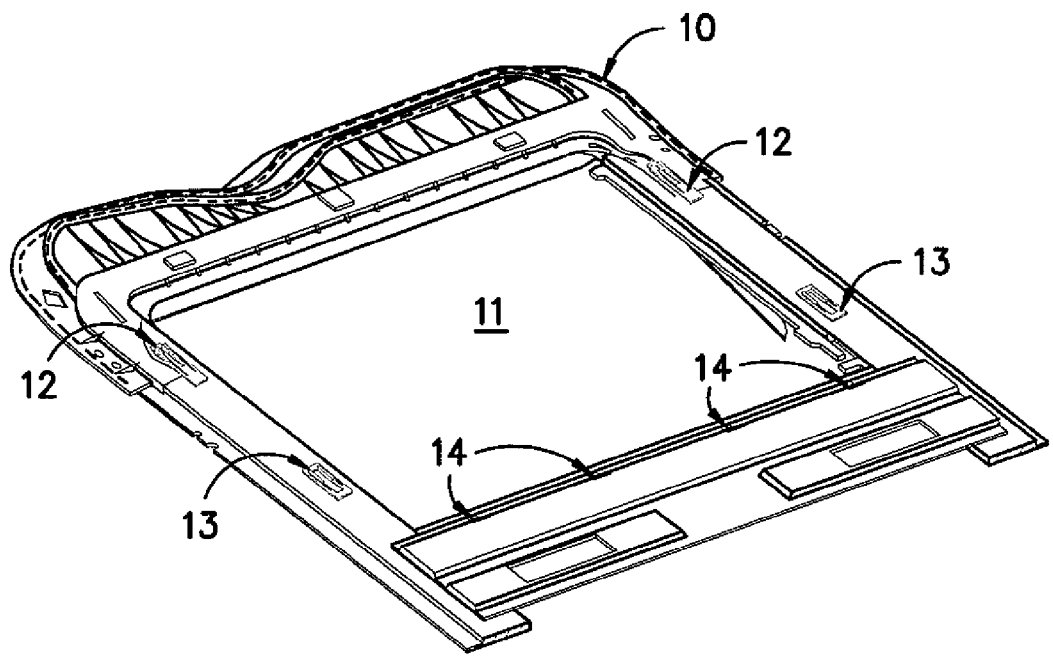
FIG. -1-
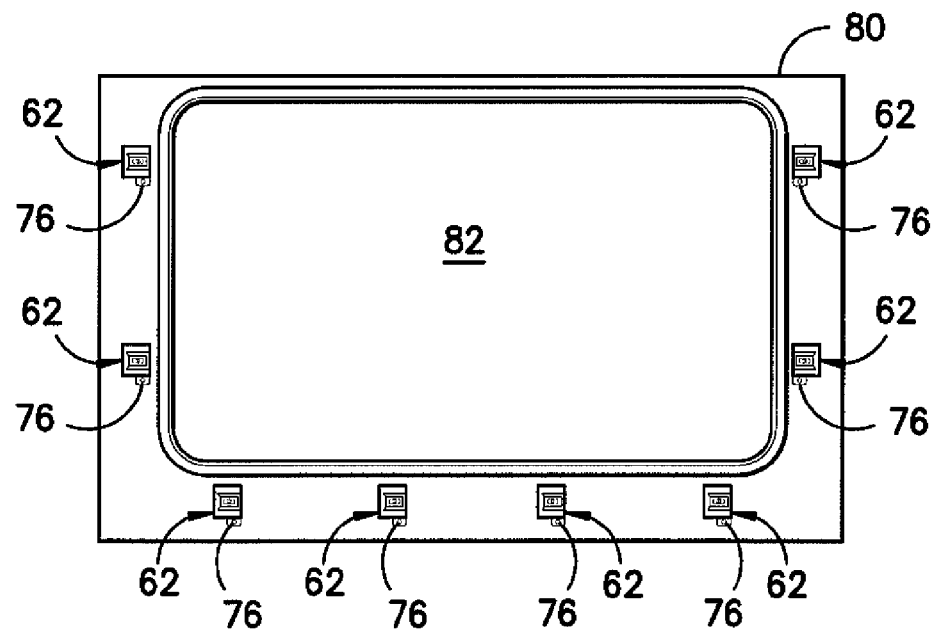
FIG. -2-

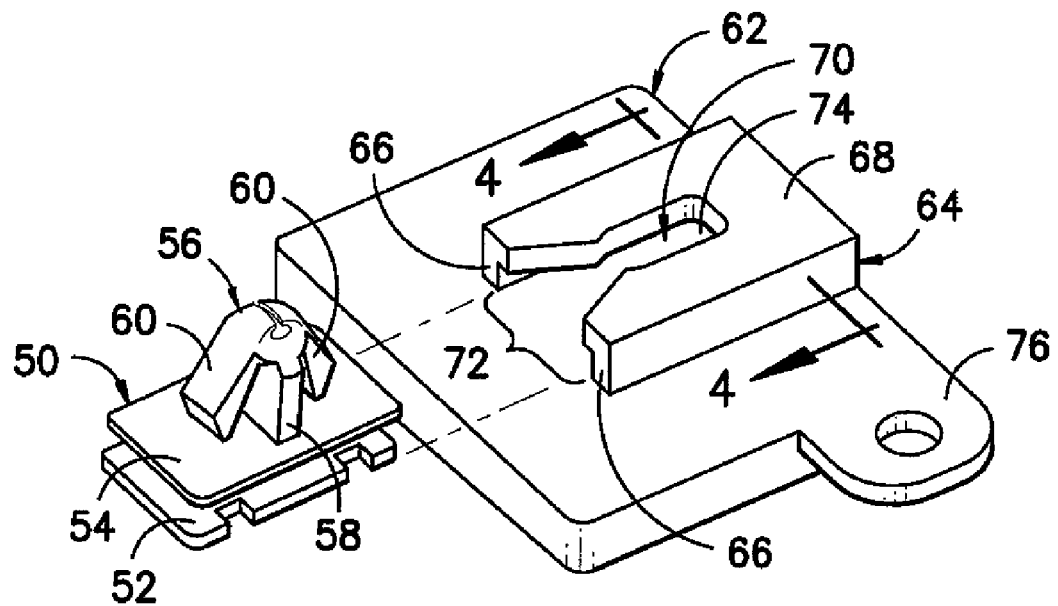
FIG. -3-
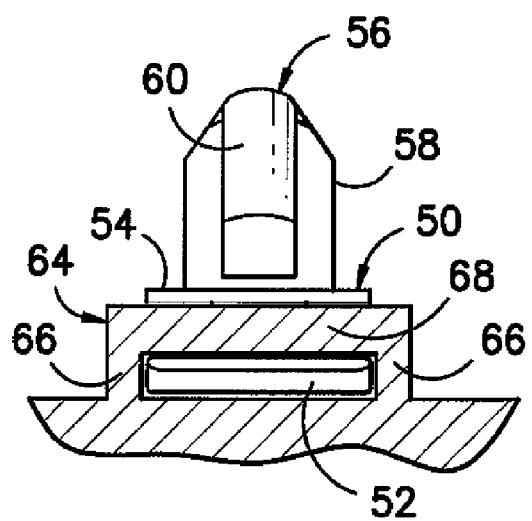
FIG. -4-

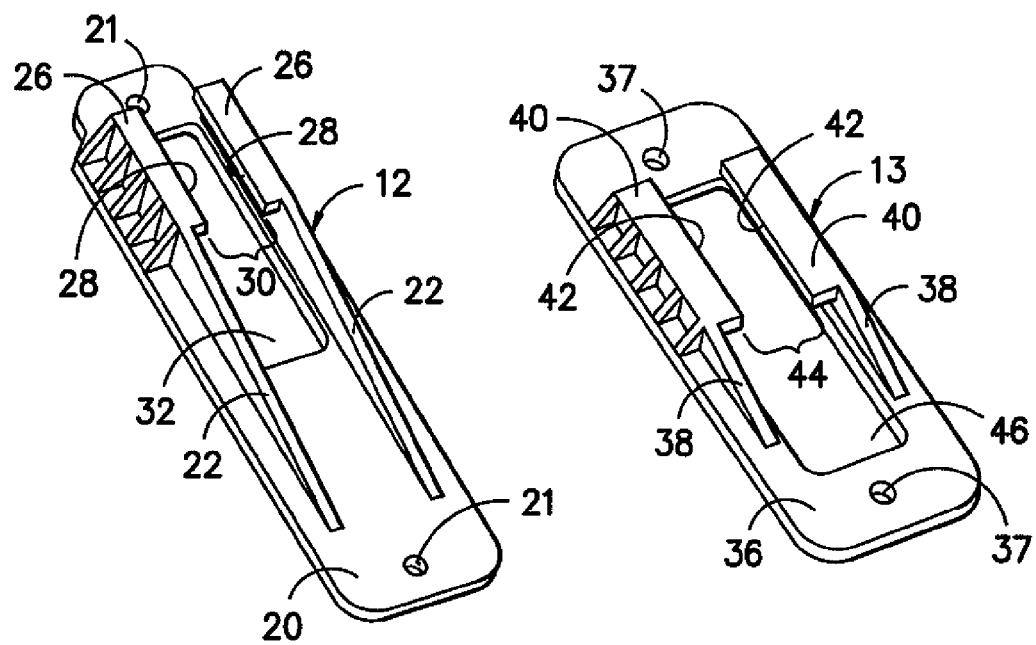
FIG. -5-
FIG. -6-
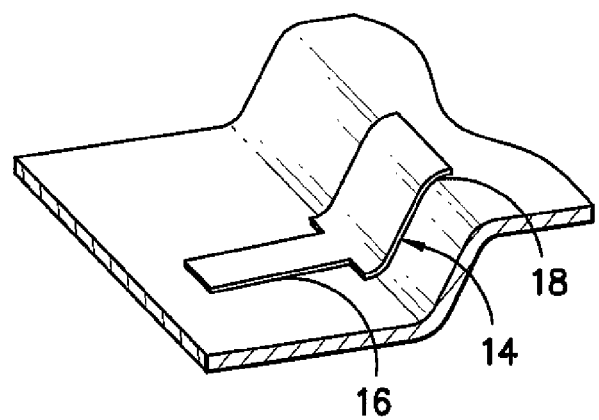
FIG. -7-

SUNROOF HEADLINER ATTACHMENT SYSTEM

CROSS-REFERENCE TO RELATED APPLICATION

This application is national phase of PCT/US2010/024773 filed on Feb. 19, 2010 and claims the benefit of U.S. Provisional Application No. 61/161,557 filed Mar. 19, 2009.

TECHNICAL FIELD

The present invention relates generally to attachment systems and is more particularly directed to a system for attachment of a headliner in relation to a sunroof within a vehicle. In this regard, it is to be understood that by the term "sunroof" is meant any portal in the roof, including a moon roof, stationary vista port or the like. The attachment system incorporates a plurality of snap-in male fastening elements projecting away from support structures disposed in a pattern along portions of the headliner in adjacent relation to the sunroof opening. The male fastening elements engage slotted acceptors to permit longitudinal sliding displacement relative to the length dimension of the slot openings while substantially preventing transverse or vertical displacement during engagement.

BACKGROUND

In many transportation vehicles, an opening is provided in the roof to permit the introduction of additional light and air during operation. Such openings are referred to generally as "sunroofs." The sunroof typically includes an assembly frame surrounding an opening in which a sliding window is mounted. The assembly frame is secured to the underlying metal of the vehicle roof body. An aesthetic and noise damping headliner of a stabilized felt material or the like typically extends in surrounding relation to the sunroof in covering relation to the sunroof assembly frame and outboard portions of the roof. The headliner is required to be held in secure relation relative to the assembly frame.

In the past, dual lock fastening systems requiring relatively high levels of installation force have been used to establish the connection of the headliner to the sunroof assembly frame. The relatively high force levels required for installation have required a worker to be positioned at the interior of the vehicle to provide adequate upward pushing force during assembly. The need for high installation forces may also lead to incidents of misalignment or partial engagement. Moreover, such systems may be prone to damage during disassembly.

SUMMARY

The present invention provides an attachment system for a headliner relative to a sunroof assembly frame that facilitates secure attachment with low insertion force requirements. The attachment system utilizes an arrangement of male connectors arranged in a pattern across an upper surface of the headliner adapted to face upwardly away from the seating area such that the male connectors project towards the roof body. The male members are held within suitable support structures such as brackets, strips or the like that can accept and retain a male connector. By way of example only, the male connectors may be held at blocks referred to herein as "pucks" formed from a suitable material such as talc-filled polypropylene or the like. The pucks are glued or otherwise connected across the surface of the headliner facing towards the roof.

In accordance with one exemplary aspect, the present invention provides a vehicle headliner attachment system for displaceable attachment of a headliner in at least partial covering relation to a sunroof assembly frame. The attachment system includes at least one snap-in male connector including a distal insertion head adapted to be press fit into a corresponding elongated female acceptance slot disposed at a position adjacent to the perimeter of a sunroof opening in the assembly frame. At least one support element is adapted to be secured to the headliner. The support element is further adapted to hold the male connector with the insertion head projecting outwardly away from the headliner. The support element includes a connector retention structure adapted to releaseably hold the male connector. The support element is oriented on the headliner such that the insertion head of the male connector is slideable along the elongated female acceptance slot adjacent to the perimeter of the sunroof opening without disengaging from the support element when the headliner is moved rearward relative to the assembly frame.

In accordance with another exemplary aspect, the present invention provides a vehicle headliner attachment system for displaceable attachment of a headliner in at least partial covering relation to a sunroof assembly frame. The attachment system includes at least one snap-in male connector including a distal insertion head adapted to be press fit into a corresponding elongated female acceptance slot disposed at a position adjacent to the perimeter of a sunroof opening in the assembly frame. At least one puck element is adapted to be secured to the headliner. The puck element is further adapted to hold the male connector with the insertion head projecting outwardly away from the headliner. The puck element includes a connector retention structure adapted to slidingly receive the male connector such that the male connector is slidable along an insertion slot within the connector retention structure and is substantially blocked from movement in directions transverse to the insertion slot. The puck element is oriented on the headliner such that the insertion head of the male connector is slideable along the elongated female acceptance slot adjacent to the perimeter of the sunroof opening substantially without movement relative to the insertion slot when the headliner is moved rearward relative to the assembly frame.

In accordance with another exemplary aspect, the present invention provides a vehicle headliner attachment system for displaceable attachment of a headliner in at least partial covering relation to a sunroof assembly frame. The attachment system includes at least one snap-in male connector including a "W" profile distal insertion head adapted to be press fit into a corresponding elongated female acceptance slot disposed at a position adjacent to the perimeter of a sunroof opening in the assembly frame. The snap-in male connector further includes a split level base including a lower level held by a post in spaced apart relation from an upper level. At least one puck element is adapted to be secured to the headliner. The puck element is further adapted to hold the male connector with the insertion head projecting outwardly away from the headliner. The puck element includes an integral raised doghouse structure including a pair of lateral stand-off legs and an upper platform extending between the stand-off legs, wherein the upper platform includes an insertion slot adapted to slidingly receive the male connector such that the upper platform of the doghouse is disposed between the lower level and the upper level of the split level base. The male connector is slideable along the insertion slot relative to the surface of the puck and is substantially blocked from movement in directions transverse to the insertion slot. The puck element is oriented on the headliner such that the insertion head of the male connector is slideable along the elongated female acceptance slot adjacent to the perimeter of the sunroof opening substantially without movement relative to the insertion slot when the headliner is moved rearward relative to the assembly frame.

In accordance with one exemplary arrangement, male connectors attached to pucks oriented along lateral sides of the opening in the headliner may engage "C" channel acceptors facing downwardly away from the lateral sides of the sunroof assembly frame. The male connectors attached to pucks oriented along the base of the sunroof opening in the headliner may project through variable width slots in the rear rail of the assembly frame. Using this arrangement, assembly may be carried out by snap-in connection. Disassembly may be carried out by sliding the male fastening elements longitudinally out of the corresponding channel acceptors and slot openings. Engagement and disengagement may be carried out with low force requirements.

BRIEF DESCRIPTION OF THE DRAWINGS

FIG. 1 is an image illustrating an exemplary sunroof assembly frame showing positions for placement of "C" channel members or other channel acceptors along lateral sides and positions for slot openings along a side of the assembly frame;

FIG. 2 is a plan view showing exemplary positions for placement of pucks holding male connectors across an upper surface of a headliner in adjacent relation to an opening within the headliner;

FIG. 3 illustrates an exemplary configuration of a puck for attachment across a surface of the headliner, the puck includes a doghouse for acceptance and retention of an illustrated exemplary "W" head male connector;

FIG. 4 is a cut-away assembly view taken generally along line 4-4 of FIG. 3 illustrating attachment of the exemplary "W" head male connector within the doghouse of an exemplary attachment puck;

FIG. 5 illustrates a first exemplary "C" channel member adapted to accept a "W" head male connector;

FIG. 6 illustrates a second exemplary "C" channel member adapted to accept a "W" head male connector; and FIG. 7 illustrates an exemplary acceptance slot for placement along the rear rail of the sunroof assembly frame;

Before the embodiments of the invention are explained in detail, it is to be understood that the invention is in no way limited in its application to the details of construction and/or the arrangements of the components set forth in the following description or illustrated in the drawings. Rather, the invention is capable of other embodiments and of being practiced or carried out in various ways. Also, it is to be understood that the phraseology and terminology used herein are for purposes of description only and should not be regarded as limiting. The use herein of "including", "comprising", and variations thereof is meant to encompass the items listed thereafter and equivalents, as well as additional items and equivalents thereof

DETAILED DESCRIPTION

Reference will now be made to the drawings wherein like elements are designated by like reference numerals in the various views. FIG. 1 illustrates an exemplary sunroof assembly frame 10 surrounding a sunroof opening 11 adapted to house a slideable panel of glass or other material in a manner as will be well known to those of skill in the art. In this regard, the illustrated surface of the assembly frame 10 is adapted to face downwardly away from a roof body panel and towards the interior of a vehicle passenger compartment (not shown). As illustrated through joint reference to FIGS. 1 and 5, the assembly frame 10 includes attachment points for a pair of first "C" channel members 12 disposed along lateral sides of the assembly frame 10 adjacent the forward cross rail of the assembly frame 10. As illustrated through joint reference to FIGS. 1 and 6, the assembly frame 10 also includes attachment points for a pair of second "C" channel members 13 disposed along lateral sides of the assembly frame 10 at positions rearward of the first "C" channel members. Of course, a larger or smaller number of "C" Channel members may be used as desired. As shown, the "C" channel members 12, 13 are oriented generally longitudinally relative to the lateral sides of the assembly frame 10 and are also in substantial alignment with the length dimension of the vehicle.

As best illustrated through joint reference to FIGS. 1 and 7, in the exemplary arrangement the assembly frame 10 also includes a number of variable width cut-out slots 14 disposed generally along a rear rail of the assembly frame 10. As shown, one exemplary configuration for the variable width cut-out slots 14 includes a narrow finger segment 16 projecting away from a wider cut-out base segment 18. The finger segment 16 preferably has a substantially constant width along its length dimension. In this arrangement the finger segment 16 projects generally towards the forward cross rail with the base segment 18 being disposed along a raised edge of the rear rail. Thus, the base segment 18 is angled upwardly relative to the finger segment 16 at a position rearward of the finger segment. In this regard, it will be understood that within this application the terms "forward" and "rearward" and counterparts refer to positions relative to the orientation of the vehicle compartment such that a front seated passenger is considered to be rearward of the windshield or other forward surface.

FIG. 5 illustrates an exemplary construction for the first pair of "C" channel members 12. As shown, the exemplary first "C" channel members 12 may each include a first support platform 20 of elongated, substantially rectangular geometry. Attachment openings 21 extend through the first support platform 20 for acceptance of screws or other attachment devises (not shown) for connection to the assembly frame 10. A pair of spaced-apart first ramp members 22 extend in substantially parallel relation to one another in the length dimension inboard of lateral edges of the first support platform 20. As shown through joint reference to FIGS. 1 and 5, the first ramp members 22 each have a rearward end and a forward end. The elevation relative to the first platform 20 increases from the rearward end to the forward end. The first ramp members 22 rise from the surface of the first support platform 20 to a corresponding pair of first elevated ledges 26. The pair of first elevated ledges 26 have a generally flat, planar construction defining a pair of first overhang structures 28. As shown, the inboard edges of the first overhang structures 28 project from the planes of the first ramp members 22 towards the centerline of the first support platform 20. The inboard edges of the first overhang structures 28 define the sides of a first acceptance gap opening 30 disposed above a first platform opening 32 in the plane of the first support platform 20. The first elevated ledges 26 in conjunction with the underlying first support platform 20 thus define a substantially "C" shaped cross-section which may be used to engage a "W" head male connector in a manner as will be described further hereinafter.

FIG. 6 illustrates an exemplary construction for the pair of second "C" channel members 13. As shown, the exemplary second "C" channel members 13 each include a second support platform 36 of elongated, substantially rectangular geometry. Attachment openings 37 extend through the second support platform 20 for acceptance of screws or other attachment devises (not shown) for connection to the assembly frame 10. A pair of second spaced-apart ramp members 38 extends in substantially parallel relation to one another in the length dimension inboard of lateral edges of the second support platform 36. As shown through joint reference to FIGS. 1 and 6, the second ramp members 38 each have a rearward end and a forward end. The elevation relative to the second support platform 36 increases from the rearward end to the forward end. The second ramp members 38 rise from the surface of the second support platform 36 to a pair of corresponding second elevated ledges 40 of generally flat, planar construction defining a pair of second overhang structures 42. The inboard edges of the second overhang structures 42 project from the planes of the second ramp members 38 towards the centerline of the second support platform 36. As shown, the inboard edges of the second overhang structures 42 define the sides of a second acceptance gap opening 44 disposed above a second platform opening 46 in the plane of second support platform 36. The second elevated ledges 40 in conjunction with the underlying second support platform 36 thus define a substantially "C" shaped cross-section which may be used to engage a "W" head male connector in a manner as will be described further hereinafter.

The "C" channel members 12, 13 and the cut-out slots 14 are each adapted to receive and retain a "W" head male connector 50 (FIG. 3). Of course, it will be understood the "W" head male connector 50 is exemplary only, and any suitable male connector may likewise be used. Such male connectors may be formed from materials such as molded polymers or the like as will be known to those of skill in the art. In the exemplary illustrated embodiment, the "W" head male connector 50 includes a split base having a lower level 52 and an upper level 54 held in connected and spaced-apart relation by a generally centrally located pillar (not shown). In the illustrated exemplary construction, both the lower level 52 and the upper level 54 have a generally planar configuration although other configurations may likewise be used. The exemplary male connector 50 also includes an outwardly projecting insertion head 56. As shown, the insertion head 56 has a generally "W" shaped profile defined by a substantially fixed position center post 58 with a pair of bendable wings 60 extending in angled relation downwardly from the distal end of the center post 58. The bendable wings 60 preferably have a reduced thickness in the vicinity of the connection to the center post 58 so as to facilitate spring-like flexing of the wings 60 towards the center post 58 upon application of an applied inward compression force.

As best illustrated through joint reference to FIGS. 3, and 4, in the exemplary practice the male connector 50 is operatively connected to a puck 62 of generally block-like construction. The puck 62 may be formed from a suitable material such as talc-filled polypropylene or other material as may be desired. As shown, the exemplary puck 62 includes an integral raised profile doghouse 64 adapted to receive the male connector 50 such that the insertion head 56 of the male connector projects outwardly away from the puck 62. As shown, in the exemplary embodiment, the doghouse 64 includes a pair of relatively narrow width lateral stand-off legs 66 running substantially along the length of the doghouse 64. The stand-off legs extend away from the upper surface of the puck 62 to a doghouse upper platform 68. As shown, portions of the doghouse upper platform 68 extend inwardly away from the lateral stand-off legs to define supported ledges held in raised and spaced-apart relation from the upper surface of the puck 62.

In the exemplary embodiment, the doghouse upper platform 68 includes an elongated insertion slot 70 adapted to slidingly receive and retain a central connection post (not shown) extending between the lower level 52 and the upper level 54 of the male connector base in substantial alignment with the center post 58 of the insertion head 56. In the exemplary arrangement, the exemplary insertion slot 70 has a converging chute structure with a wide entrance 72 converging towards a post retention segment 74 of substantially constant width for housing the post connecting the lower level 52 and the upper level 54 of the male connector base. As will be appreciated, such a chute structure may be beneficial in promoting centered insertion of the male connector 50 into the doghouse 64.

As best seen in FIG. 4, in order to promote secure retention of the male connector 50 within the doghouse 64, the thickness of the doghouse upper platform 68 is preferably substantially equivalent to the spacing distance between the lower level 52 and the upper level 54 of the male connector base. Likewise, the width of the post retention segment 74 is preferably substantially equivalent to the effective diameter of the connection post extending between the lower level 52 and the upper level 54 of the male connector 50. Such an arrangement substantially secures the male connector 50 against displacement in the vertical direction as well as against displacement transverse to insertion slot 70 and the flex direction of the insertion head wings 60. However, movement of the male connector 50 along the insertion slot 70 substantially in the flex direction of the insertion head wings 60 is nonetheless permitted.

As shown, the exemplary puck 62 may also include a tab 76 projecting outwardly from the puck 62. Such tabs may be used in conjunction with automated equipment to aid in locating and installing the pucks on the headliners. The tab 76 also may be grasped by a user to aid in manipulating the puck 62 and the attached male connector 50.

As best seen in FIG. 2, a plurality of pucks 62 as previously described may be arranged in a pattern along segments of a headliner 80 in surrounding relation to a headliner opening 82 which is adapted to be positioned in substantially aligned relation with the sunroof opening 11 in the assembly frame 10. By way of example only, such a headliner may be formed from fusion bonded felt, pre-formed plastic or similar material. As will be appreciated, such headliner materials typically have some degree of stiffness and are molded by a thermal process to have a desired shape. However, other materials may likewise be used. The attachment of the pucks 62 to the headliner 80 may be by adhesive or other attachment mechanisms as may be desired. In this regard, the pucks 22 project away from the underside of the headliner 80 so as to face towards the surface of the assembly frame 10 which is illustrated in FIG. 1. As shown, the positions of the pucks 62 are arranged in a pattern to be substantially aligned with the positions of the corresponding "C" channel members 12, 13 and the cut-out slots 14.

During attachment of the headliner 80, to the assembly frame 10, the "W" head male connectors 50 extend outwardly from the pucks 62 and towards the illustrated surface of the assembly frame 10. In this orientation, the "W" head male connectors 50 positioned along lateral sides of the headliner opening 82 may be press fit into the corresponding "C" channel members 12, 13 projecting downwardly from the lateral sides of the assembly frame 10. Likewise, the "W" head male connectors positioned along the rearward edge of the headliner opening 82 may be press fit into the corresponding cut-out slots 14 disposed along the rear rail of the assembly frame 10.

During the press-fit operation, the "W" head male connectors 50 on pucks 62 disposed on the lateral sides at positions adjacent to the forward corners of the headliner opening 82 may be press-fit into first acceptance gap openings 30 in the first "C" channel members 12. During this press-fit operation, the wings 60 of insertion heads 56 (FIG. 3) will flex inwardly as they pass through the first acceptance gap openings 30 and will then snap behind the first overhang structures 28 such that they are held in place against vertical removal. Likewise, the "W" head male connectors 50 on pucks 62 disposed on the lateral sides at positions adjacent to the rear corners of the headliner opening 82 may be press-fit into corresponding second acceptance gap openings 44 in the second set of "C" channel members 13. During this press-fit operation, the wings 60 of insertion heads 56 (FIG. 3) will flex inwardly as they pass through the second acceptance gap openings 44 and will then snap behind the second overhang structures 42 such that they are held in place against vertical removal.

The "W" head male connectors 50 on pucks 62 disposed along the rear edge of the headliner opening 82 may be press-fit into corresponding finger segments 16 of corresponding cut-out slots 14 (FIG. 7). During this press-fit operation, the wings 60 of insertion heads 56 will flex inwardly as they pass through the openings defined by the finger segments 16 and then snap behind the edges of the finger segments 16.

As will be appreciated, in the illustrated and potentially preferred arrangement, the length dimensions of the "C" channel members 12, 13 and the cut-out slots 14 are substantially aligned with the length dimension of the vehicle. Thus, in the final assembly, each of the pucks 62 is preferably oriented such that the flex direction of the wings 60 and the orientation of the insertion slot 70 in the doghouse 64 is transverse to the length dimension of the vehicle as well as to the length dimensions of the "C" channel members 12, 13 and the cut-out slots 14. Accordingly, following the snap-in attachment, the male connectors 50 may be moved in sliding relation along the "C" channel members 12, 13 and the cut-out slots while being held within the pucks 62. This arrangement promotes ease of attachment and removal of the headliner 80.

By way of example only, during attachment of the headliner 80 to the assembly frame 10, the headliner 80 may be inserted into the occupant compartment of a vehicle through the windshield opening. Hooks (not shown) may be used to provide attachment of the headliner to the front rail of the assembly frame 10 in a manner as will be known to those of skill in the art. The "W" head male connectors 50 projecting away from pucks 62 along lateral sides of the headliner opening 82 are then pressed into the corresponding "C" channel members 12, 13 arranged along the lateral sides of the assembly frame 10. The "W" head male connectors projecting away from pucks 62 disposed along the lower edge of the headliner opening are then are pressed into the finger segments 16 of the cut-out slots 14 at the rear rail of the assembly frame 10. Of course, this order of insertion may be reversed if desired.

By way of example only, during disengagement of the headliner, the front hooks of the headliner are disengaged and the headliner is pushed towards the rear of the vehicle passenger compartment. The "W" head male connectors 50 projecting away from pucks 62 along lateral sides of the headliner opening slide out of the corresponding "C" channel members 12, 13 and the "W" head male connectors projecting away from pucks 62 disposed along the lower edge of the opening in the headliner slide from the narrow finger segments 16 to the wider base segments 18 of the cut-out slots. In this arrangement the headliner can fall away from the assembly frame 10 and be removed. Moreover, the components are not damaged during disassembly and may be reused.

As will be noted through comparison of FIGS. 5 and 6, in the illustrated arrangement, the first elevated ledges 26 in the first "C" channel members 12 are shorter than the second elevated ledges 40 in the second "C" channel members 13. Such an arrangement provides a degree of additional control during disengagement. Specifically, as the headliner 80 is pulled rearwardly, the shorter first elevated ledges 26 in the first set of "C" channel members 12 cause the forward portion of the headliner 80 to disengage before the portions held at the second "C" channel members 13. Likewise, orienting the base segments 18 of cut-out slots 14 on a raised surface extending upwardly from the plane of the finger segments 16 may facilitate holding the rear edge of the headliner 80 in place until the final stage of disengagement. Thus, a staged, sequential disengagement of the headliner 80 may be achieved with the forward portions being released first, followed in order by the middle and rear sections. Of course, a substantially simultaneous disengagement may also be practiced if desired Of course, variations and modifications of the foregoing are within the scope of the present invention. Thus, it is to be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. the claims are to be construed to include alternative embodiments and equivalents to the extent permitted by the prior art.

What is claimed is:

1. A vehicle headliner attachment system for displaceable attachment of a headliner in at least partial covering relation to a sunroof assembly frame, the attachment system comprising:

at least one snap-in male connector including a distal insertion head adapted to be press fit into a corresponding retaining segment of an elongated closed end female acceptance slot by pressing the distal insertion head between opposing edges of the retaining segment, the elongated female acceptance slot being disposed at a position adjacent to the perimeter of a sunroof opening in the assembly frame; and at least one support element adapted to be secured to the headliner at a position adjacent a headliner opening adapted for alignment with the sunroof opening, the support element being further adapted to hold the male connector with the insertion head projecting outwardly away from the headliner, wherein the support element includes a connector retention structure adapted to releaseably hold the male connector, and wherein the support element is oriented on the headliner such that the insertion head of the male connector is slideable along the elongated female acceptance slot adjacent to the perimeter of the sunroof opening without disengaging from the support element when the headliner is moved rearward relative to the assembly frame, and wherein the retaining segment of the elongated female acceptance slot has a width less than the insertion head and is open at a rearward end, such that during attachment of the headliner across the sunroof assembly frame, the headliner may be inserted into an occupant compartment through a windshield opening and the distal insertion head may be inserted into the retaining segment of the elongated female acceptance slot to secure the headliner in at least partial covering relation to the sunroof assembly frame, and such that the headliner may be subsequently disengaged from the sunroof assembly frame by moving the headliner rearward, such that the insertion head slidingly disengages from the retaining segment and the headliner can be removed.

2. The vehicle headliner attachment system as recited in claim 1, wherein the distal insertion head is substantially "W" shaped including a center post and a pair of flexible wing elements disposed in angled relation to the center post and wherein the elongated female acceptance slot is defined by a "C" channel member disposed along a lateral side of the assembly frame, wherein the "C" channel member includes a pair of spaced apart elevated ledges with the retaining segment of the elongated female acceptance slot disposed between the elevated ledges such that the length dimension of the elongated female acceptance slot is substantially aligned with the lateral side of the assembly frame.

3. The vehicle headliner attachment system as recited in claim 1, wherein the distal insertion head is substantially "W" shaped including a center post and a pair of flexible wing elements disposed in angled relation to the center post and wherein the elongated female acceptance slot is defined by a variable width slot disposed along a rear side of the assembly frame, wherein the variable width slot includes a finger segment defining the retaining segment adapted to engage and retain the distal insertion head and a base segment of enhanced width relative to the finger segment disposed rearward of the finger segment.

4. The vehicle headliner attachment system as recited in claim 1, comprising a plurality of snap-in male connectors releaseably held at support elements disposed in a predefined pattern along lateral and rear sides of the headliner opening, at least a portion of said plurality of snap-in male connectors comprising "W" shaped distal insertion heads adapted to snap into corresponding further retaining segments of open ended elongated female acceptance slots disposed along lateral sides of the assembly frame adjacent to the perimeter of the sunroof opening during attachment of the headliner across the sunroof assembly frame, and being further adapted to subsequently slidingly disengage from the further retaining segments of the elongated female acceptance slots by moving the headliner rearward during removal of the headliner.

5. The vehicle headliner attachment system as recited in claim 4, wherein two or more elongated female acceptance slots are disposed along each lateral side of the assembly frame.

6. The vehicle headliner attachment system as recited in claim 5, including a first "C" channel member disposed at a first position along a first lateral side of the assembly frame and a second "C" channel member disposed at a second position along the first lateral side rearward of the first position, the first "C" channel member including a pair of spaced apart first elevated ledges defining a first elongated female acceptance slot with a retaining segment disposed between the first elevated ledges such that the length dimension of the first elongated female acceptance slot is substantially aligned with the first lateral side of the assembly frame, the second "C" channel member including a pair of spaced apart second elevated ledges defining a second elongated female acceptance slot with a retaining segment disposed between the second elevated ledges such that the length dimension of the second elongated female acceptance slot is substantially aligned with the first lateral side of the assembly frame.

7. The vehicle headliner attachment system as recited in claim 6, wherein the first elongated female acceptance slot is shorter than the second elongated female acceptance slot.

8. The vehicle headliner attachment system as recited in claim 6, wherein two or more elongated female acceptance slots are disposed along the rear side of the assembly frame, the elongated female acceptance slots disposed along the rear side of the assembly frame each being defined by a variable width slot including a finger segment defining one of the retaining segments adapted to engage and retain one of the distal insertion heads during attachment of the headliner and a base segment of enhanced width relative to the finger segment disposed rearward of the finger segment, the base segment adapted to release the distal insertion head when the headliner is moved rearward during removal of the headliner.

9. The vehicle headliner attachment system as recited in claim 6, wherein the connector retention structure is integral with the support element.

10. The vehicle headliner attachment system as recited in claim 1, wherein the support element includes a tab, and wherein the support element is oriented such that the tab projects in a direction substantially parallel with the elongated female acceptance slot.

11. A vehicle headliner attachment system for displaceable attachment of a headliner in at least partial covering relation to a sunroof assembly frame, the attachment system comprising:

at least one snap-in male connector including a distal insertion head adapted to be press fit into a corresponding retaining segment of an elongated closed end female acceptance slot by pressing the distal insertion head between opposing edges of the retaining segment, the elongated female acceptance slot being disposed at a position adjacent to the perimeter of a sunroof opening in the assembly frame; and at least one puck element adapted to be secured to the headliner at a position adjacent a headliner opening adapted for alignment with the sunroof opening, the puck element being further adapted to hold the male connector with the insertion head projecting outwardly away from the headliner, wherein the puck element includes a connector retention structure comprising an insertion slot adapted to slidingly receive the male connector such that the male connector is slidable along the insertion slot within the connector retention structure and is substantially blocked from movement in directions transverse to the insertion slot, and wherein the puck element is oriented on the headliner such that the insertion head of the male connector is slideable along the elongated female acceptance slot adjacent to the perimeter of the sunroof opening substantially without movement relative to the insertion slot when the headliner is moved rearward relative to the assembly frame, and wherein the retaining segment of the elongated female acceptance slot has a width less than the insertion head and is open at a rearward end, such that during attachment of the headliner across the sunroof assembly frame, the headliner may be inserted into an occupant compartment through a windshield opening and the distal insertion head may be inserted into the retaining segment of the elongated female acceptance slot to secure the headliner in at least partial covering relation to the sunroof assembly frame, and such that the headliner may be subsequently disengaged from the sunroof assembly frame by moving the headliner rearward, such that the insertion head slidingly disengages from the retaining segment and the headliner can be removed.

12. The vehicle headliner attachment system as recited in claim 11, wherein the distal insertion head is substantially "W" shaped including a center post and a pair of flexible wing elements disposed in angled relation to the center post and wherein the elongated female acceptance slot is defined by a "C" channel member disposed along a lateral side of the assembly frame, wherein the "C" channel member includes a pair of spaced apart elevated ledges with the retaining segment of the elongated female acceptance slot disposed between the elevated ledges such that the length dimension of the elongated female acceptance slot is substantially aligned with the lateral side of the assembly frame.

13. The vehicle headliner attachment system as recited in claim 11, wherein the distal insertion head is substantially "W" shaped including a center post and a pair of flexible wing elements disposed in angled relation to the center post and wherein the elongated female acceptance slot is defined by a variable width slot disposed along a rear side of the assembly frame, wherein the variable width slot includes a finger segment defining the retaining segment adapted to engage and retain the distal insertion head during attachment of the headliner and a base segment of enhanced width relative to the finger segment disposed rearward of the finger segment, the base segment adapted to release the distal insertion head when the headliner is moved rearward during removal of the headliner.

14. The vehicle headliner attachment system as recited in claim 11, comprising a plurality of snap-in male connectors releaseably held at puck elements disposed in a predefined pattern along lateral and rear sides of the headliner opening, at least a portion of said plurality of snap-in male connectors comprising "W" shaped distal insertion heads adapted to snap into corresponding further retaining segments of open ended elongated female acceptance slots disposed along lateral sides of the assembly frame adjacent to the perimeter of the sunroof opening during attachment of the headliner across the sunroof assembly frame, and being further adapted to subsequently slidingly disengage from the further retaining segments of the elongated female acceptance slots by moving the headliner rearward during removal of the headliner.

15. The vehicle headliner attachment system as recited in claim 14, wherein two or more elongated female acceptance slots are disposed along each lateral side of the assembly frame.

16. The vehicle headliner attachment system as recited in claim 15, including a first "C" channel member disposed at a first position along a first lateral side of the assembly frame and a second "C" channel member disposed at a second position along the first lateral side rearward of the first position, the first "C" channel member including a pair of spaced apart first elevated ledges defining a first elongated female acceptance slot with a retaining segment disposed between the first elevated ledges such that the length dimension of the first elongated female acceptance slot is substantially aligned with the first lateral side of the assembly frame, the second "C" channel member including a pair of spaced apart second elevated ledges defining a second elongated female acceptance slot with a retaining segment disposed between the second elevated ledges such that the length dimension of the second elongated female acceptance slot is substantially aligned with the first lateral side of the assembly frame.

17. The vehicle headliner attachment system as recited in claim 16, wherein the first elongated female acceptance slot is shorter than the second elongated female acceptance slot.

18. The vehicle headliner attachment system as recited in claim 16, wherein two or more elongated female acceptance slots are disposed along the rear side of the assembly frame, the elongated female acceptance slots disposed along the rear side of the assembly frame each being defined by a variable width slot including a finger segment defining one of the retaining segments adapted to engage and retain one of the distal insertion heads during attachment of the headliner and a base segment of enhanced width relative to the finger segment disposed rearward of the finger segment, the base segment adapted to release the distal insertion head when the headliner is moved rearward during removal of the headliner.

19. The vehicle headliner attachment system as recited in claim 11, wherein the puck element includes a tab, and wherein the puck element is oriented such that the tab projects in a direction substantially parallel with the elongated female acceptance slot.

20. A vehicle headliner attachment system for displaceable attachment of a headliner in at least partial covering relation to a sunroof assembly frame, the attachment system comprising:

at least one snap-in male connector including a "W" profile distal insertion head adapted to be press fit into a corresponding retaining segment of an elongated closed end female acceptance slot by pressing the distal insertion head between opposing edges of the retaining segment, the elongated female acceptance slot being disposed at a position adjacent to the perimeter of a sunroof opening in the assembly frame, the snap-in male connector further including a split level base including a lower level held in spaced apart relation from an upper level; and at least one puck element adapted to be secured to the headliner at a position adjacent a headliner opening adapted for alignment with the sunroof opening, the puck element being further adapted to hold the male connector with the insertion head projecting outwardly away from the headliner, wherein the puck element includes an integral raised doghouse structure including a pair of lateral stand-off legs and an upper platform extending between the stand-off legs, wherein the upper platform includes an insertion slot adapted to slidingly receive the male connector such that the upper platform of the doghouse is disposed between the lower level and the upper level of the split level base such that the male connector is slidable along the insertion slot relative to the surface of the puck and is substantially blocked from movement in directions transverse to the insertion slot, and wherein the puck element is oriented on the headliner such that the insertion head of the male connector is slideable along the elongated female acceptance slot adjacent to the perimeter of the sunroof opening substantially without movement relative to the insertion slot when the headliner is moved rearward relative to the assembly frame, and wherein the retaining segment of the elongated female acceptance slot has a width less than the insertion head and is open at a rearward end such that during attachment of the headliner across the sunroof assembly frame, the headliner may be inserted into an occupant compartment through a windshield opening and the distal insertion head may be inserted into the retaining segment of the elongated female acceptance slot to secure the headliner in at least partial covering relation to the sunroof assembly frame, and such that the headliner may be subsequently disengaged from the sunroof assembly frame by moving the headliner rearward, such that the insertion head slidingly disengages from the retaining segment and the headliner can be removed.

* * * * *